(12) United States Patent
Sanville

(10) Patent No.: US 10,929,019 B1
(45) Date of Patent: Feb. 23, 2021

(54) ENHANCED SERVICING FOR MULTI-DRIVE SLEDS

(71) Applicant: EMC IP Holding Company LLC, Hopkinton, MA (US)

(72) Inventor: Alex Joseph Sanville, Upton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 15/790,365

(22) Filed: Oct. 23, 2017

(51) Int. Cl.
*G06F 3/06* (2006.01)

(52) U.S. Cl.
CPC .......... *G06F 3/0605* (2013.01); *G06F 3/0635* (2013.01); *G06F 3/0689* (2013.01)

(58) Field of Classification Search
CPC ............... G06F 3/0653; G06F 3/0605; G06F 3/0604–0607; G06F 3/0629; G06F 3/067; G06F 3/0635; G06F 3/0689; H05K 13/0486
See application file for complete search history.

(56) References Cited

U.S. PATENT DOCUMENTS

| | | | | |
|---|---|---|---|---|
| 5,808,587 A * | 9/1998 | Shima | ................ | G07C 9/00103 340/10.34 |
| 6,510,050 B1 * | 1/2003 | Lee | ...................... | G11B 33/125 312/223.1 |
| 7,155,568 B2 * | 12/2006 | Richard | ................ | G06F 3/0601 711/114 |
| 7,536,588 B2 * | 5/2009 | Hafner | ................ | G06F 11/1088 714/20 |
| 2005/0193237 A1 * | 9/2005 | Topham | ................ | G06F 11/004 714/6.21 |
| 2014/0353264 A1 * | 12/2014 | Venugopal | ........... | H05K 7/1487 211/41.17 |
| 2015/0009616 A1 * | 1/2015 | Adrian | ................. | H05K 7/1494 361/679.32 |
| 2017/0054593 A1 * | 2/2017 | Borikar | ................... | H04L 49/35 |

(Continued)

OTHER PUBLICATIONS

"IBM System Storage SAN Volume Controller: Troubleshooting Guide", May 12, 2013, IBM, GC27-2284-04, 1-334 (Year: 2013).*

(Continued)

*Primary Examiner* — Reginald G Bragdon
*Assistant Examiner* — Curtis James Kortman
(74) *Attorney, Agent, or Firm* — Amin, Turocy & Watson, LLP

(57) ABSTRACT

Data storage facilities that provide data storage services are typically arranged as either individually accessible drive facilities or multi-carrier drive facilities, but both types must contend with hardware failures that require storage device (e.g., drives) to be replaced. Multi-carrier drive facilities generally have greatly increased drive density, but are confronted with challenges with respect to service operations that are not present for facilities with individually accessible drives. For example, replacing a faulted storage device can entail bringing the faulted storage device as well as other (e.g., non-faulted) storage devices offline during the service operation, which can impact the data storage services. Techniques that improve service for multi-carrier drive facilities are presented. Such techniques can improve coordination between elements that manage the storage facility and those that provide service to faulted storage elements.

20 Claims, 10 Drawing Sheets

(56) References Cited

U.S. PATENT DOCUMENTS

2017/0123954 A1\* 5/2017 Shih .................... G06F 11/3034
2017/0235696 A1\* 8/2017 Huang ................ G06F 13/4068
710/200

OTHER PUBLICATIONS

"Wi-Fi", Sep. 29, 2016, Wikipedia, Revision 08:33, Sep. 29, 2016, pp. 1-18, https://en.wikipedia.org/w/index.php?title=Wi-Fi&oldid=741728222 (Year: 2016).\*

Janet Morss, "Dell PowerEdge C8000 Series Overview with the Architect Joe Sekel", Sep. 19, 2012, YouTube Video, minutes 0-14. (Screenshot of opening scene provided for identification) https://www.youtube.com/watch?v=suSqFAHz3eM (Year: 2012).\*

\* cited by examiner

ENHANCED SERVICING FOR MULTI-DRIVE SLEDS

TECHNICAL FIELD

The present application relates generally to techniques for servicing data storage devices and, more specifically, to servicing devices that are situated on a sled, carrier, or other housing device that houses multiple storage devices.

BACKGROUND

Data centers or other storage facilities generally endeavor to store as much data as possible. To accomplish that end, emphasis is often placed not only on how much data can be stored per drive, but also how many drives can be situated in a given physical space.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
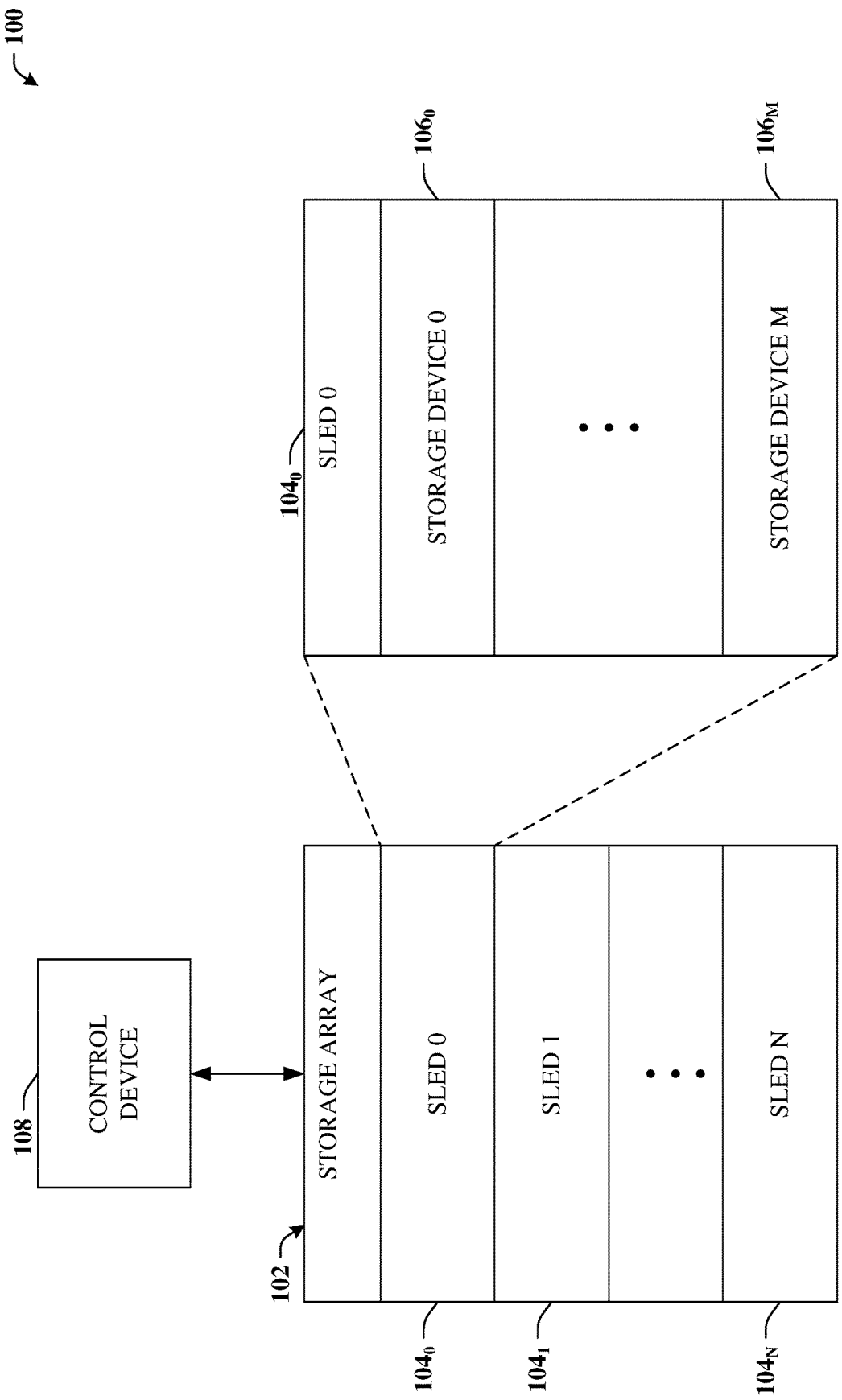
FIG. 1 illustrates a block diagram of an example multi-carrier drive facility in accordance with certain embodiments of this disclosure.

In addition to increasing the capacity of individual storage devices (e.g., drives), data storage facilities and/or storage arrays can achieve benefits by increasing the number of drives that are housed in the facility of finite physical dimensions. Such is referred to herein as "drive density", which can represent a ratio of a number of drives to the physical volume or space required to house those drives.

As with most devices, storage devices typically have a finite service life. When a storage device fails or requires service for another suitable reason, service personnel are typically dispatched to replace the storage device or otherwise service the failed or failing storage device. Efficient service generally requires that the faulty drive be readily accessible to service personnel. Hence, a significant expense in terms of the drive density that a facility can achieve is directly related to physical space constraints introduced by maintenance of drive accessibility. In that regard, storage facilities can be classified as either individually accessible drive facilities or multi-carrier drive facilities.

Most conventional storage facilities are individually accessible drive facilities that situate storage devices in a manner that is independent from other storage devices such that each individual storage device can be individually and independently accessed by service personnel. One advantage of this arrangement is that service of a single drive typically has little impact on the services provided by the storage facility. For example, data on the failed drive can be rebuilt elsewhere, and only the failed drive need be brought offline during the service operation to replace the drive. Ideally, the data on the failed drive is rebuilt on a new drive and there is no loss of data integrity or availability thereafter, regardless of the service operation. On the other hand, these types of facilities typically cannot achieve the drive density of multi-carrier drive facilities.

A typical multi-carrier drive facility can have a housing unit, referred to herein as a "sled" or "sled device" that houses multiple storage devices. When a storage device requires service, the corresponding sled can be located, then retracted to gain access to the failed drive. A benefit of the multi-carrier arrangement is that the storage facility can achieve significantly higher drive density. Such is due in part to the fact that space requirements associated with service operations can be assessed on a per-sled basis instead of a per-drive basis, and thus significantly reduced overall. However, one issue that arises in the context of a multi-carrier drive facility is that retracting the sled in order to gain access to the failed device decouples all storage devices situated on that sled from the storage array, including storage device(s) that are working properly, but are brought offline during the service procedure because the failed storage device shares a common sled.

As a result, for multi-carrier drive facilities, the entire storage array is often brought offline in order to effectuate a service operation. The disclosed subject matter is, in some embodiments, directed to techniques to improve or enhance servicing of multi-carrier drive facilities. In some embodiments, these techniques can enable a storage facility to achieve a drive density similar to expectations associated with multi-carrier drive facilities, while achieving a very low impact from service operations similar to that of individually accessible drive facilities.

Such techniques are, in some embodiments, directed to creating a lock-step process between the operating system (OS) and/or control device that manages a storage array, the other hardware elements of the storage array, and interaction by entities such as service personnel. For example, it is noted that when a storage device has failed or otherwise requires service, the OS and/or associated control device can detect the failure condition. In a storage facility operating under the individually accessible drive paradigm, a fault indicator can be activated on the failed storage device, which can be subsequently replaced as soon as service personnel arrive on location. A similar strategy with respect to multi-carrier drive facilities is, however, insufficient. Rather, in the latter case, the OS and/or associated control device can further determine that if the non-faulted drives on the same sled device as the faulted drive are removed that there is little or no impact to the service provided by the storage facility. If there is a conflict, then the conflict can be addressed before authorizing the sled device to be retracted and all storage devices situated thereon be brought offline (e.g., communicatively decoupled from the storage array).

Upon detecting the faulted drive, a user interface that is accessible to service personnel can be updated. For example, the user interface can be set to a particular state that indicates one of the drives on a particular sled has faulted and needs to be replaced or otherwise serviced. In some embodiments, multiple user interfaces can exist, such as a different user interface for each sled device. In some embodiments, the user interface can operate in connection with multiple sled devices.

It is understood that an appreciable amount of time may pass from the time in which a fault indicator is presented by the user interface (which might be substantially concurrent with the faulted storage device being detected) and the time service personnel arrive at the corresponding sled device to commence the service operation. In the interim, the OS and/or control device can begin at least a portion of certain operations to prepare for multiple storage devices, potentially both faulted and non-faulted, being brought offline. For example, data from the faulted drive can be rebuilt to be referenced elsewhere in the storage array (e.g., a different storage device that is not on the same sled device).

In some embodiments, data on the non-faulted device can, but need not be, rebuilt or copied elsewhere. Rather, in that interim period, data on the non-faulted device can be accessed as normal. Moreover, the user interface can be set to a state that indicates it is not safe to remove the sled device or otherwise begin the service procedure. When the service personnel arrive at the corresponding sled device, this indicator that is it is not safe to remove the sled device is typically presented. After the interim period, the control device and/or associated OS can make other preparations, particularly with regard to data stored on the non-faulted drives. The end to this interim period can be determined in response to an indication that the service operation is ready to begin, which typically corresponds with the service personnel arriving at the location of the faulted device. Such can be determined based on a signal that the service personnel are in place and ready to begin the service procedure. In some embodiments, such can be determined in response to input to the user interface. For example, the service personnel can press a button on the user interface or enter other suitable input to one or more elements of the user interface.

In some embodiments, the 'ready to begin' signal can represent an alert that the service procedure is ready to begin from the perspective of the service personnel. In response, the control device and/or associated OS or other software can instruct the user interface to acknowledge such by setting the user interface to another state. For example, the user interface can be instructed to toggle an LED (or another user interface element) on/off several times. Such might be the same LED (or other user interface element) that indicates it is not safe to begin the service procedure, or a different LED (or other user interface element).

The user interface can remain in this state (e.g., blinking acknowledgement that the service operation is ready to begin) or, after a period of time, return to the state that indicates it is not safe to begin the service procedure. The control device and/or OS can make final preparations for the forthcoming event of all storage devices, including those storage devices that are functioning properly, on a particular sled being brought offline. Once adequate preparations are made, the user interface can be set to yet another state (e.g., turn off the "not safe to begin" LED), to indicate that it is now safe to begin the service procedure from the perspective of the control device.

Once the sled is restored back to the operational position, the control device and/or OS can begin to use the new storage device immediately as well as put the other storages devices (e.g., those that were not faulted) on the shared sled back into service and the user interface can be set to the state that indicates it is not safe to remove the sled device.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawings, with initial reference to FIG. 1, an example multi-carrier drive facility 100 is depicted. Facility 100 can comprise a data storage array that can provide various services relating to data storage. In the multi-carrier drive architecture, facility 100 can comprise sled devices $104_0$-$104_N$, where N can be substantially any positive integer. Any of the sled devices $104_0$-$104_N$ can comprise multiple storage devices $106_0$-$106_M$, wherein M can be substantially any positive integer. It is understood that sled devices $104_0$-$104_N$, and storage devices $106_0$-$106_M$ can respectively be referred to herein, either collectively or individually as sled device(s) 104 and storage device(s) 106, with appropriate subscripts employed generally only when necessary or convenient to highlight various distinctions or to better impart the disclosed concepts.

As depicted, a given sled device 104 (e.g., sled device $104_0$) can house multiple storage devices 106, which can substantially increase drive density for the storage array 102. Sled device 104 can physically retract or move between two positions referred to herein as an operating position and a service position. In the operating position, the storage devices 106 are typically coupled to a power source and communicatively coupled to the storage array 102, but generally are not accessible for service. The service position can represent a position of the sled device 104 that has been moved or retracted from the operating position. In the service position, the storage device 106 can be service-accessible, but are typically decoupled from the storage array and a power source.

Facility 100 can also include control device 108 that can operate or manage storage array 102, e.g., to provide various data storage services to clients as well as maintenance and other services intended to maintain the health of the storage array. In some embodiments, control device 108 can execute a special OS designed specifically for large storage arrays.

Figure 2:
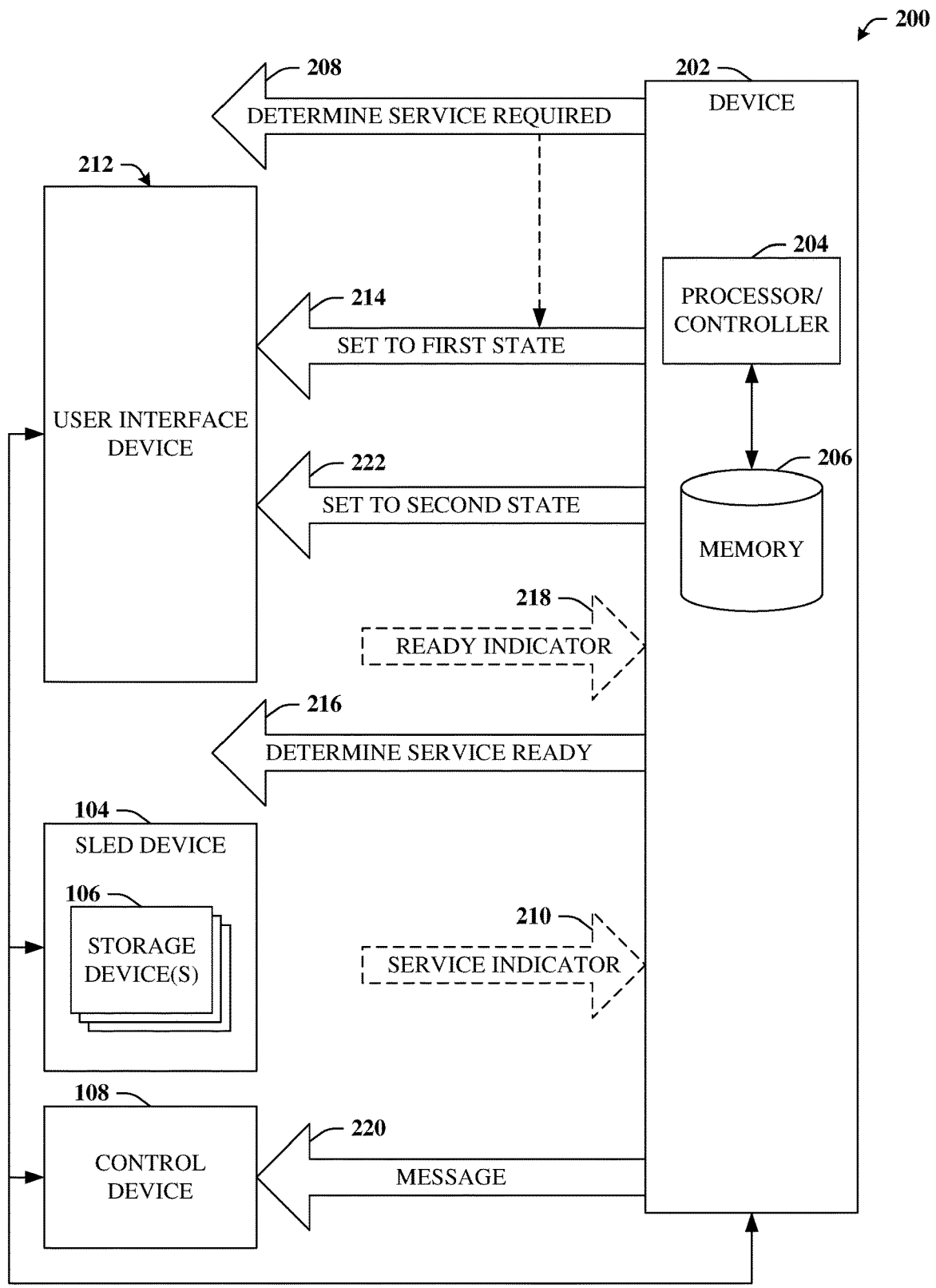
FIG. 2 depicts a block diagram of an example system that can facilitate enhanced or improved service in conjunction with multi-carrier drive facilities in accordance with certain embodiments of this disclosure.

Turning now to FIG. 2, system 200 is presented. System 200 can comprise device 202 that can facilitate enhanced or improved service in conjunction with multi-carrier drive facilities, such as facility 100 detailed with respect to FIG. 1. Generally, device 202 can comprise a processor 204 and a memory 206 that stores executable instructions that, when executed by the processor 204, facilitate performance of operations. Examples of the memory 206 and processor 204 can be found with reference to FIG. 10. It is to be appreciated that the computer 1002 can represent a server device or a client device and can be used in connection with implementing one or more of the systems, devices, or components shown and described in connection with FIG. 2 and other figures disclosed herein.

As depicted by reference numeral 208, device 202 can determine that a first storage device 106 (e.g., storage device $106_0$) of a group of storage devices (e.g., storage devices $106_0$-$106_M$) that are situated on the same sled device 104, requires service. In some embodiments, determination 208 can be in response to a service indicator 210 that indicates the first storage device 106 requires service. Service indicator 210 can be provided by control device 108, by the first storage device $106_0$ itself or any other suitable device. In response to determination 208, device 202 can set user interface device 212 to a first state, as depicted by reference numeral 214. User interface device 212 being set to the first state can indicate that the first storage device $106_0$ requires service. In some embodiments, the first state can be a specific indicator that specifically indicates storage device $106_0$ requires service. In other embodiments, the first state can be a general indicator that indicates at least one of the group of storage device $106_0$-$106_M$ requires service.

It is appreciated that user interface device 212 can be set to the first state by means of setting or updating various user interface elements of the user interface device 212. In some embodiments, these user interface elements can be light-emitting diode (LED) elements, liquid crystal display (LCD) screen elements, buttons, knobs, levers, speakers, microphones, and so forth. Setting the user interface device 212 to the first state can represent a mechanism for indicating (e.g., to service personnel) that the first storage device requires. Such can be as simple as activating a specific LED or an acoustic beacon that indicates at least one storage device 106 on a particular sled device 106 requires service, or more comprehensive such as an LCD schematic presentation of the storage device 106 or the sled device 104 with suitable visual or auditory indicators being presented therewith.

As indicated previously, it is unlikely that service personnel will be on-hand the moment determination 208 is made and/or the moment user interface device 212 is set to the first state. Rather, it may be an appreciable amount of time afterwards before service personnel arrive at the location of the faulted drive (e.g., storage device $106_0$). As noted above, it can be desirable to indicate to control device 108 the time in which service is ready to begin. Accordingly, device 202 can determine that a service procedure to replace or service storage device $106_0$ is ready to begin, which is illustrated as determination 216. The service procedure typically communicatively decouples not only storage device $106_0$ from storage array 102, but the entire group of storage devices $106_0$-$106_M$ situated on a common sled device 104. Often such can include non-faulted devices as well.

In some embodiments, determination 216 can be accomplished in response to ready indicator 218, which is further detailed in connection with FIG. 3. In response to determination 216, device 202 can transmit message 220 to control device 108. Message 220 can indicate to control device 108 that the service operation is ready to begin, which will communicatively decouple the group of storage device $106_0$-$106_M$ situated on the sled device 104. In other words, message 220 can comprise an indicator that the group of storage devices $106_0$-$106_M$ will be unavailable temporarily, even though it might be the case that only storage device $106_0$ has faulted. If storage device $106_0$ is to be replaced with a new device, control device 108 will have likely already begun rebuilding the data stored at storage device $106_0$ at a different storage device elsewhere in storage array 102, typically located on a different sled device 104.

On the other hand, data stored at non-faulted drives (e.g., storage devices $106_1$-$106_M$) need not be rebuilt elsewhere, even though those devices will be unavailable during the service procedure. Hence, in some embodiments, message 220 can comprise an indicator that the control device 108 is not to treat devices $106_1$-$106_M$ as having failed in response to those devices being unavailable temporarily.

It is understood that determination 216 that the service operation is ready to begin (e.g., service personnel have arrived), does not necessarily mean that control device 108 has made all necessary preparations. Rather, it may be several moments or a few minutes more before control device 108 is ready for the group of storage devices 106 on sled device 104 to be brought offline. Thus, device 202 can set user interface device 212 to a second state, as illustrated by reference numeral 222. The second state can indicate control device 108 is not prepared for, or has not yet authorized or advised, the group of storage devices 106 to be communicatively decoupled from storage array 102. It is appreciated that setting 222 can represent a mechanism to aid in informing and/or synchronizing various disparate tasks such as the tasks managed by control device 108 and those by service personnel.

It is to be appreciated that, while device 202 has been described in connection with FIG. 2 and other figures herein as being communicatively coupled to various devices such as control device 108, sled device 104, and user interface 212, other arrangements are possible. For example, in some exemplary embodiments, control device 108 can comprise device 202. In other embodiments, sled device 104 can comprise device 202. In some embodiments, user interface device can comprise device 202. In some embodiments, device 202 can be a standalone device, as implied by FIG. 2. Furthermore, in some embodiments, sled device 104 can comprise user interface device 212.

Figure 3:
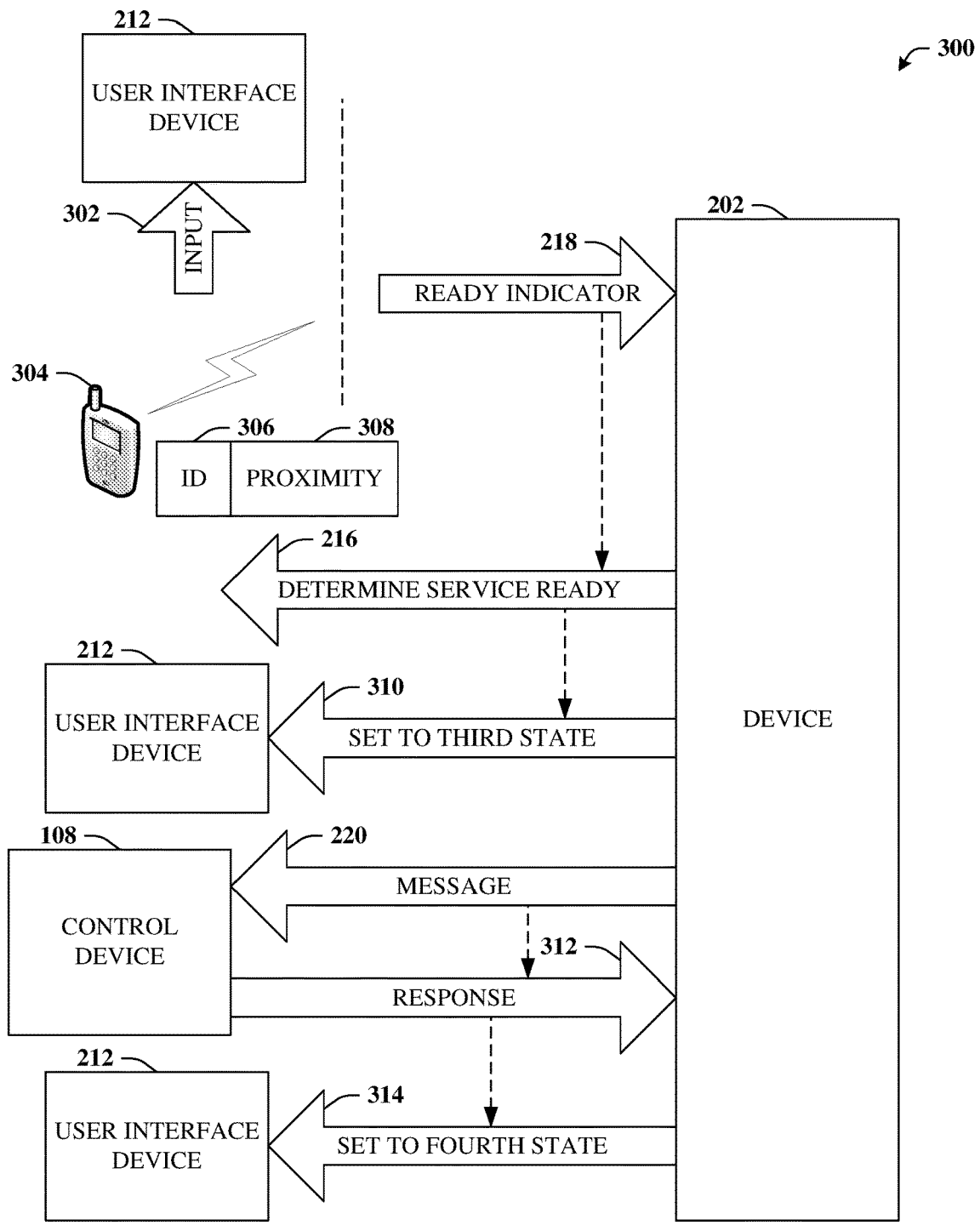
FIG. 3 depicts a block diagram of an example system that can provide for additional aspects or elements in connection with facilitating enhanced or improved service in conjunction with multi-carrier drive facilities in accordance with certain embodiments of this disclosure.

Referring now to FIG. 3, system 300 is depicted. System 300 can provide for additional aspects or elements in connection with facilitating enhanced or improved service in conjunction with multi-carrier drive facilities. For example, as previously discussed, device 202 can make determination 216 (that a service procedure is ready to begin) in response to ready indicator 218. In some embodiments, ready indicator 218 can be received in response to input 302 received at user interface device 212. As one example, service personnel, upon arriving at the location of the faulted drive can press (e.g., input 302) a button on user interface device 212 that is allocated for the express purpose of informing device 202 that the service procedure is ready to begin.

As another example, ready indicator 218 can be received in response to a determination that a service device 304 is proximal to the sled device 104 that houses the faulted storage device 106. For example, an ID 306 or tag associated with service device 304 or with a service work order can be read or otherwise determined to be within a threshold proximity 308 of the associated sled device 104. Proximity 308 can be determined based on radio frequency identification (RFID), Wi-Fi, near field communication (NFC), Bluetooth, or any other suitable techniques. Hence, when service personnel arrive on the scene, such can represent ready indicator 218, which can be leveraged to make determination 216, which can prompt device 202 to transmit message 220.

In some embodiments, device 202 can set user interface device 212 to a third state (e.g., reference numeral 310) that indicates control device 108 has been notified that the service procedure is ready to begin. Such can indicate to service personnel that their presence is acknowledged and control device 108 is preparing for the forthcoming service procedure. One example of such is to update the state of the same LED used to indicate to service personnel whether it is advised to begin the service procedure. For example, when the LED is active, such can indicate it is not advised to begin the service procedure. When the LED is not active, such can indicate the service procedure can commence. When the LED blinks on and off (e.g., the third state), such can indicate that the control device 108 has been advised that the service procedure is ready to begin. Other examples can exist, depending on implementation. It is understood that setting user interface device 212 to the third state can be in response to and/or triggered by one or more of transmitting message 220, receiving indicator 218, or making determination 216.

In some embodiments, device 202 can, in response to transmitting message 220, can receive response 312 from control device 108. Response 312 can be configured to indicate that control device 108 is prepared for the group of storage device to be communicatively decoupled from storage array 102.

In response to response 312, device 202 can set user interface device 212 to a fourth state, as illustrated by reference numeral 314. This fourth state can indicate control device 108 is prepared for the group of storage device to be communicatively decoupled from storage array 102. In other words, service personnel can be apprised that the service procedure can commence. As noted, the fourth state can be deactivating the LED that indicates the service procedure should not begin, or any other suitable indicator.

Figure 4:
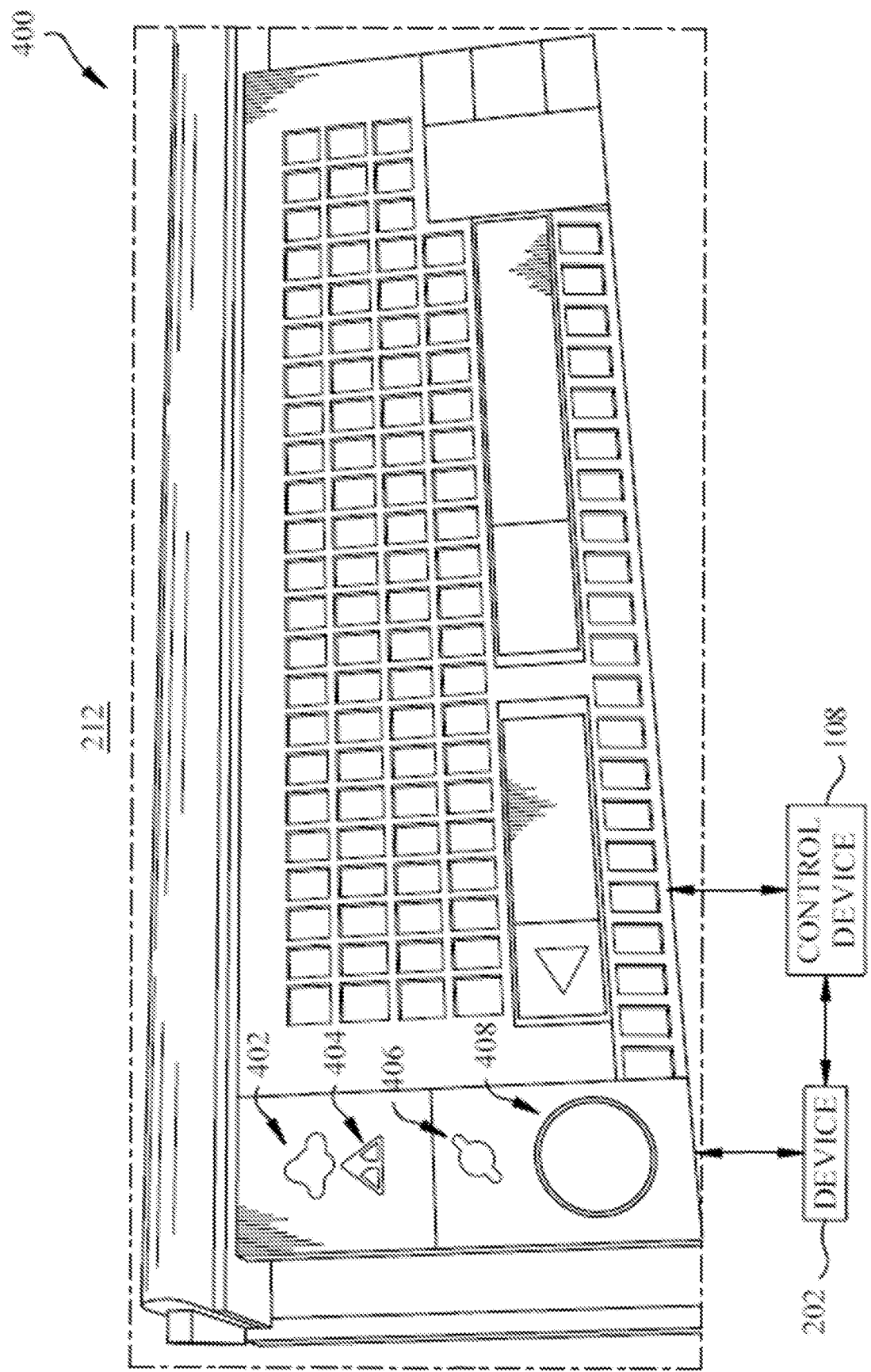
FIG. 4 illustrates a graphical depiction of an example efficient user interface device that can facilitate improved coordination for service procedures in accordance with certain embodiments of this disclosure.

Referring now to FIG. 4, graphical depiction 400 is illustrated. Graphical depiction 400 depicts an example of an efficient user interface device 212 that can facilitate improved coordination for service personnel. In some embodiments, user interface device 212 can be proximal to, or operatively or communicatively coupled to sled device 104. As depicted, user interface device 212 can comprise various UI elements 402-408. In this example, UI element 402 can indicate that an associated sled device 104 is currently active, currently has power, and/or is in the operating position when the associated LED is on as shown and otherwise when off. UI element 404 can indicate that the associated sled device 104 includes at least one faulted drive when the associated LED is on as shown, and otherwise when off. UI element 406 (e.g., another LED) can indicate that whether it is advised to begin an associated service procedure and UI element 408 (e.g., a button) can represent a mechanism to indicate the service procedure is ready to begin.

As an illustrative example, consider service personnel arriving at sled device 104 that houses a faulted drive. Typically, the service personnel will see the indicators as described. In this example, UI elements 402, 404, and 406 will be active as illustrated to respectively indicate sled device 104 has power, sled 104 contains a faulted drive, but it is not safe to begin service procedure. When service personnel arrive, UI element 408 can be pressed to inform device 202 and/or control device 108 that the service procedure is ready to begin. In response, UI element 406 can switch from the on state to a blinking state, which can inform service personnel that their presence has been acknowledged and that control device 108 is preparing the storage array 102 for temporary unavailability of all storage devices 106 housed on sled device 104. Once control device 108 has made adequate preparations, UI element can be switched off, which can indicate the service procedure can commence.

Figure 5:
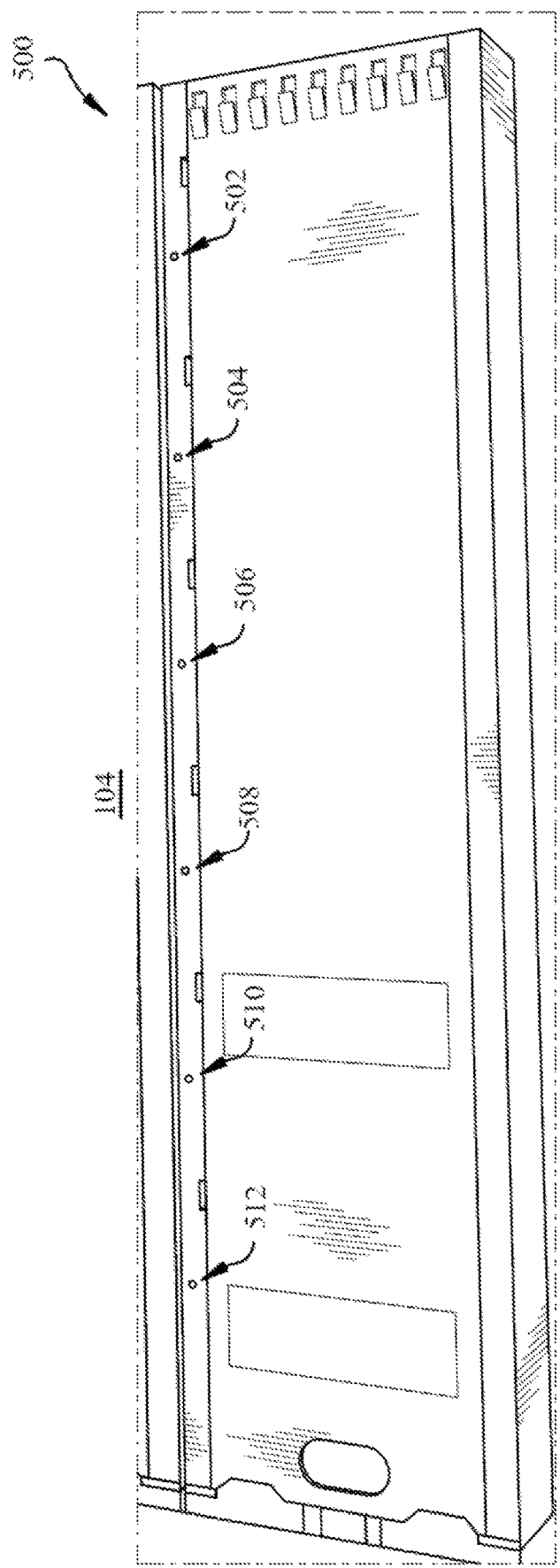
FIG. 5 illustrates a graphical depiction of a first example sled device configured to house 2.5 inch form factor storage devices in accordance with certain embodiments of this disclosure.

Turning now to FIG. 5, graphical depiction 500 is illustrated. Graphical depiction 500 illustrates a first example sled device 104. In this example, sled device 104 is configured to house six storage devices 106 having a 2.5 inch form factor. Sled device 104 can comprise a fault indicator UI element (e.g., an LED in this example) that is specific to a corresponding one of the group of storage devices 106 housed by sled device 104, which are illustrated by reference numerals 502-512. Recall for the example user interface device 212 depicted at FIG. 4, UI element 404 is configured to indicate that at least one storage device 106 on sled device 104 had faulted, but, in that embodiment, did not specify which of the group of storage devices 104 had faulted. In such embodiments, service personnel can identify which storage device(s) 104 has faulted once the sled device 104 is retracted to the service position by examining fault indicator UI elements 502-512.

It is understood that in some embodiments, retracting sled device 104 to the service position can decouple sled device 104 from a power source. In such embodiments, sled device 104 can comprise one or more super capacitors or batteries that provide power to fault indicator UI elements 502-512 when sled device 104 is in the service position or otherwise decoupled from a primary power source during the service procedure.

Figure 6:
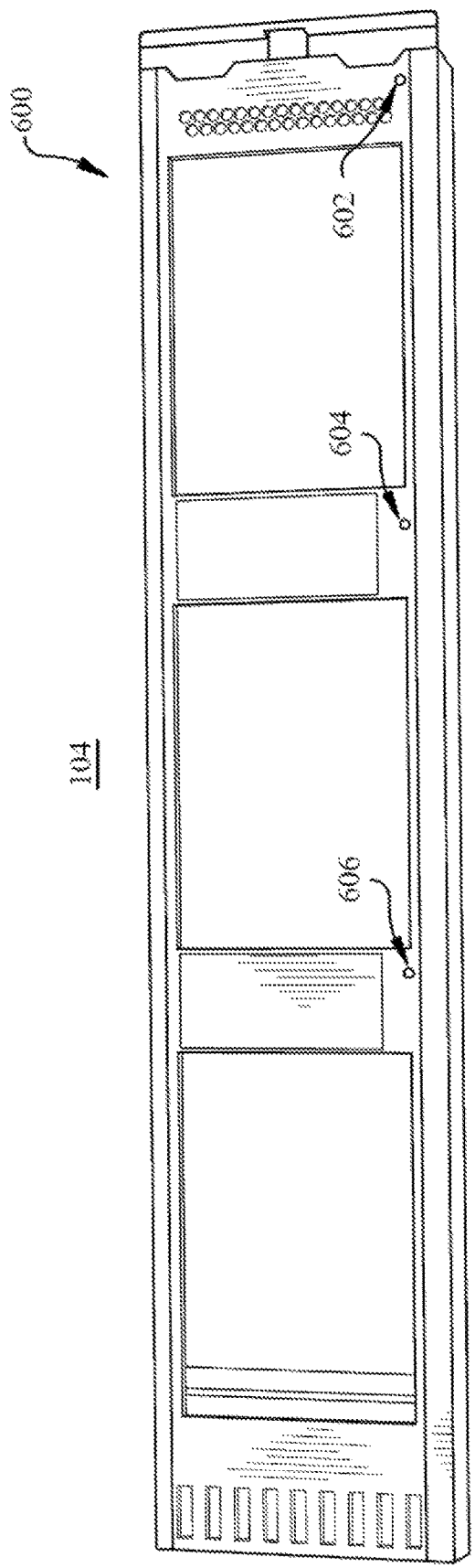
FIG. 6 illustrates a graphical depiction of a second example sled device configured to house 3.5 inch form factor storage devices in accordance with certain embodiments of this disclosure.

With reference now to FIG. 6, graphical depiction 600 is illustrated. Graphical depiction 600 illustrates a second example sled device 104. In this example, sled device 104 is configured to house three storage devices 106 having a 3.5 inch form factor. As illustrated, this example sled device 104 has a corresponding number (e.g., three) of fault indicator UI elements 602-606 that can specifically identify which of the group of storage devices 104 on sled device 104 have faulted.

Example Methods

Figure 7:
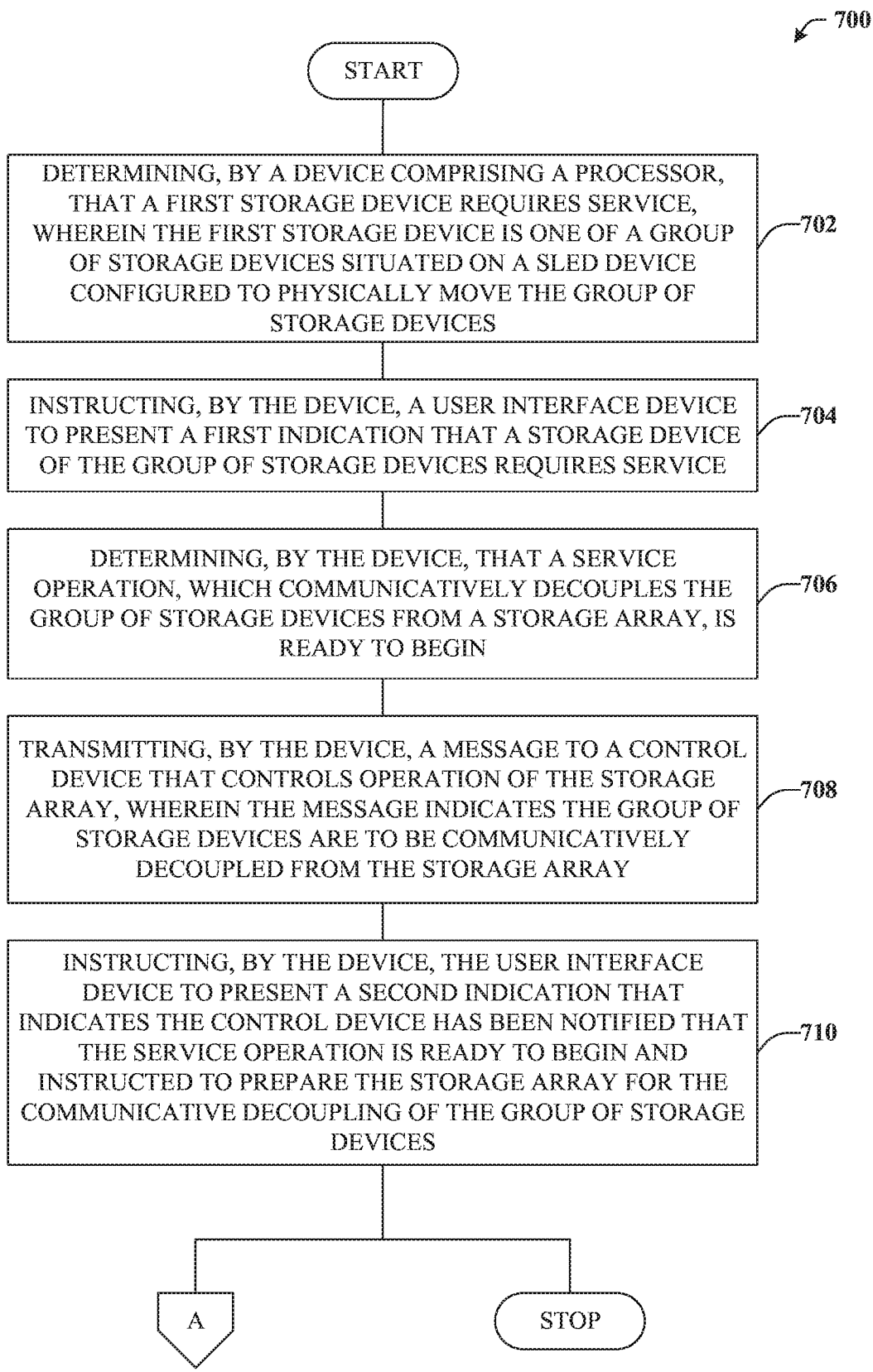
FIG. 7 illustrates an example methodology that can facilitate enhanced or improved service in conjunction with multi-carrier drive facilities in accordance with certain embodiments of this disclosure.
Figure 8:
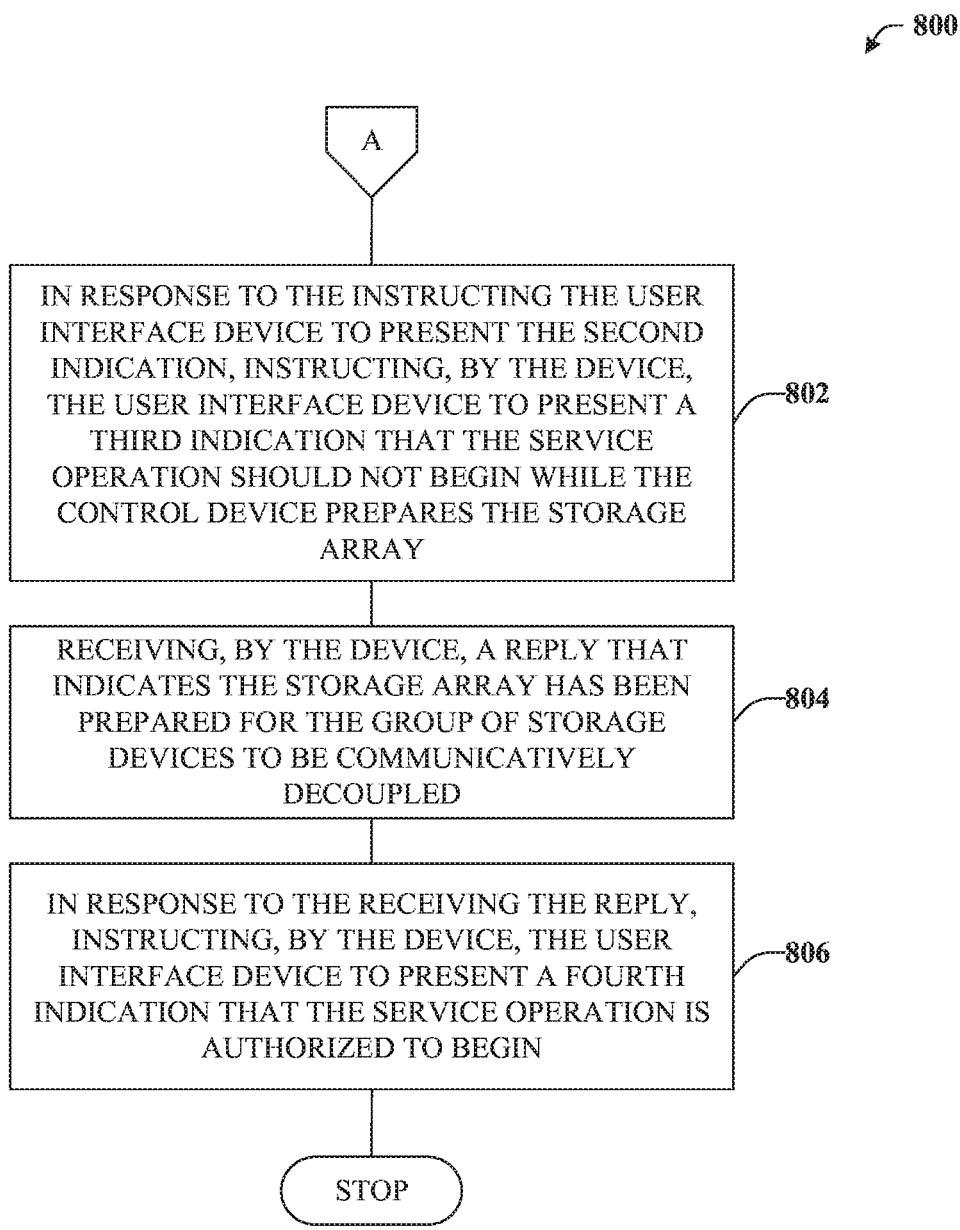
FIG. 8 illustrates an example methodology that can provide for additional elements or aspects in connection with facilitating enhanced or improved service in conjunction with multi-carrier drive facilities in accordance with certain embodiments of this disclosure.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 7, exemplary method 700 is depicted. Method 700 can facilitate enhanced or improved service in conjunction with multi-carrier drive facilities. For example, at reference numeral 702, a device comprising a processor can determine that a first storage device requires service, wherein the first storage device is one of a group of storage devices situated on a sled device configured to physically move the group of storage devices. For example, the sled device can facilitate reversibly conveying the group of storage devices from an operating position in which the group of storage devices are operatively or communicatively coupled to a storage array, to a service position in which the group of storage devices are operatively or communicatively decoupled from the storage array.

At reference numeral 704, the device can instruct a user interface device to present a first indication that a storage device of the group of storage devices requires service. In some embodiments, the first indication can be a general indication that specifies, e.g., that at least one of the group of storage devices on the sled device has faulted. In some embodiments, the first indication can be a specific indication that specifically identifies which storage device(s) of the group situated on the sled device has faulted. In some embodiments, the user interface device can be specific to the particular sled device.

At reference numeral 706, the device can determine that a service operation, which communicatively decouples the group of storage devices from a storage array, is ready to begin. In some embodiments, the device can determine that the service operation is ready to begin in response to receiving a ready indicator. In some embodiments, the ready indicator can be received in response to input to the user interface device associated with the particular sled device. For example, service personnel can provide the input to the user interface device (e.g., depress a button element) to indicate that the service operation is ready to begin.

At reference numeral 708, the device can transmit a message to a control device that controls operation of the storage array, wherein the message indicates the group of storage devices are to be communicatively decoupled from the storage array. In some embodiments, reference numeral 708 can be in response to or triggered by initiation or completion of reference numeral 706.

At reference numeral 710, the device can instruct the user interface device to present a second indication that indicates the control device has been notified that the service operation is ready to begin and instructed to prepare the storage array for the communicative decoupling of the group of storage devices. Method 700 can proceed to insert A, which is further detailed in connection with FIG. 8, or stop.

With reference now to FIG. 8, exemplary method 800 is illustrated. Method 800 can provide for additional elements or aspects in connection with facilitating enhanced or improved service in conjunction with multi-carrier drive facilities. For example, at reference numeral 802, the device can instruct the user interface device to present a third indication that the service operation should not begin while the control device prepares the storage array. In some embodiments, reference numeral 802 can be in response to or triggered by initiating or completing one or both reference numerals 706 or 708.

At reference numeral 804, the device can receive a reply (e.g., from the control device) that indicates the storage array has been prepared for the group of storage device to be communicatively decoupled. In response, at reference numeral 806, the device can instruct the user interface device to present a fourth indication that the service operation is authorized to begin.

Example Operating Environments

Figure 9:
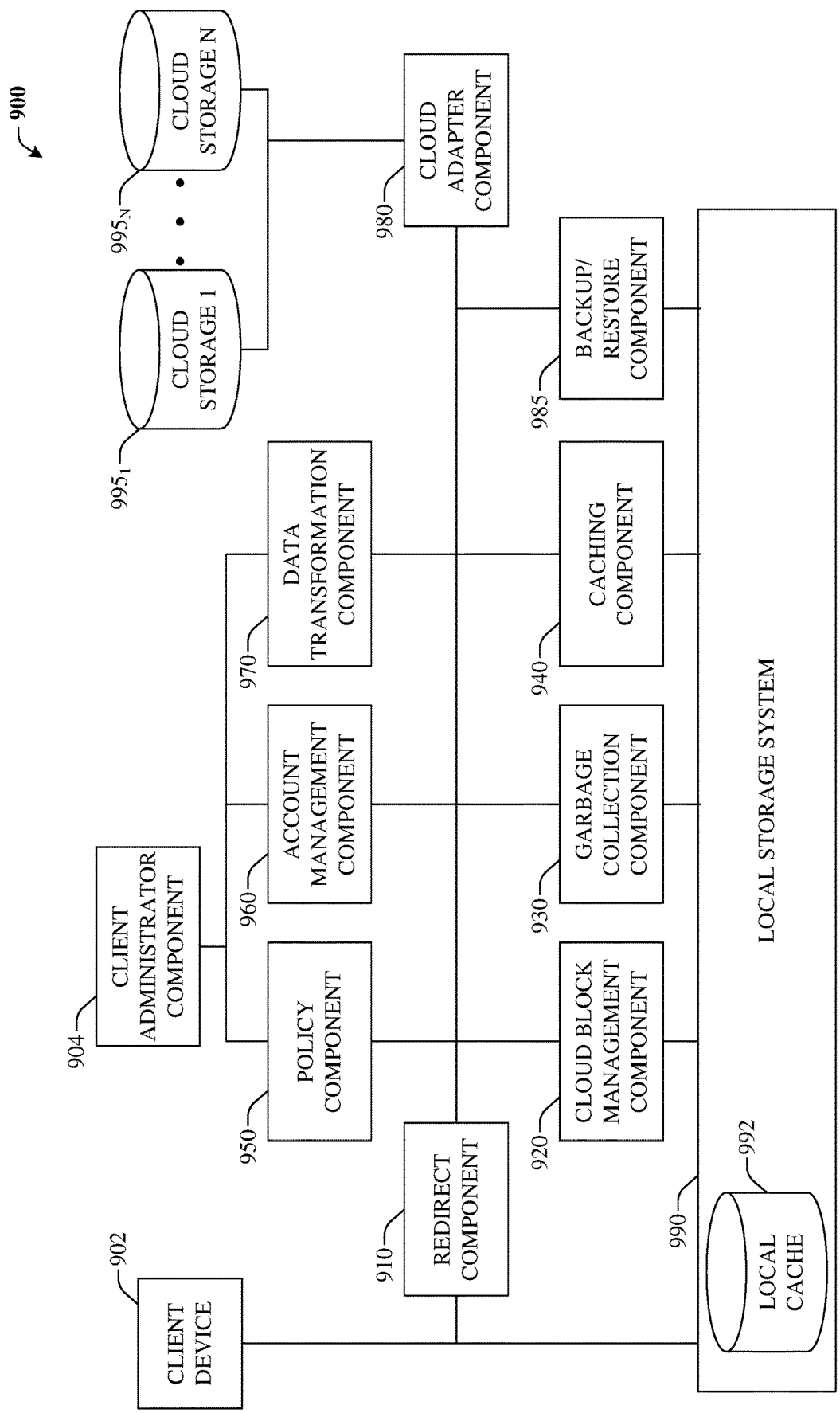
FIG. 9 illustrates a block diagram of an example distributed file storage system that employs tiered cloud storage in accordance with certain embodiments of this disclosure.
Figure 10:
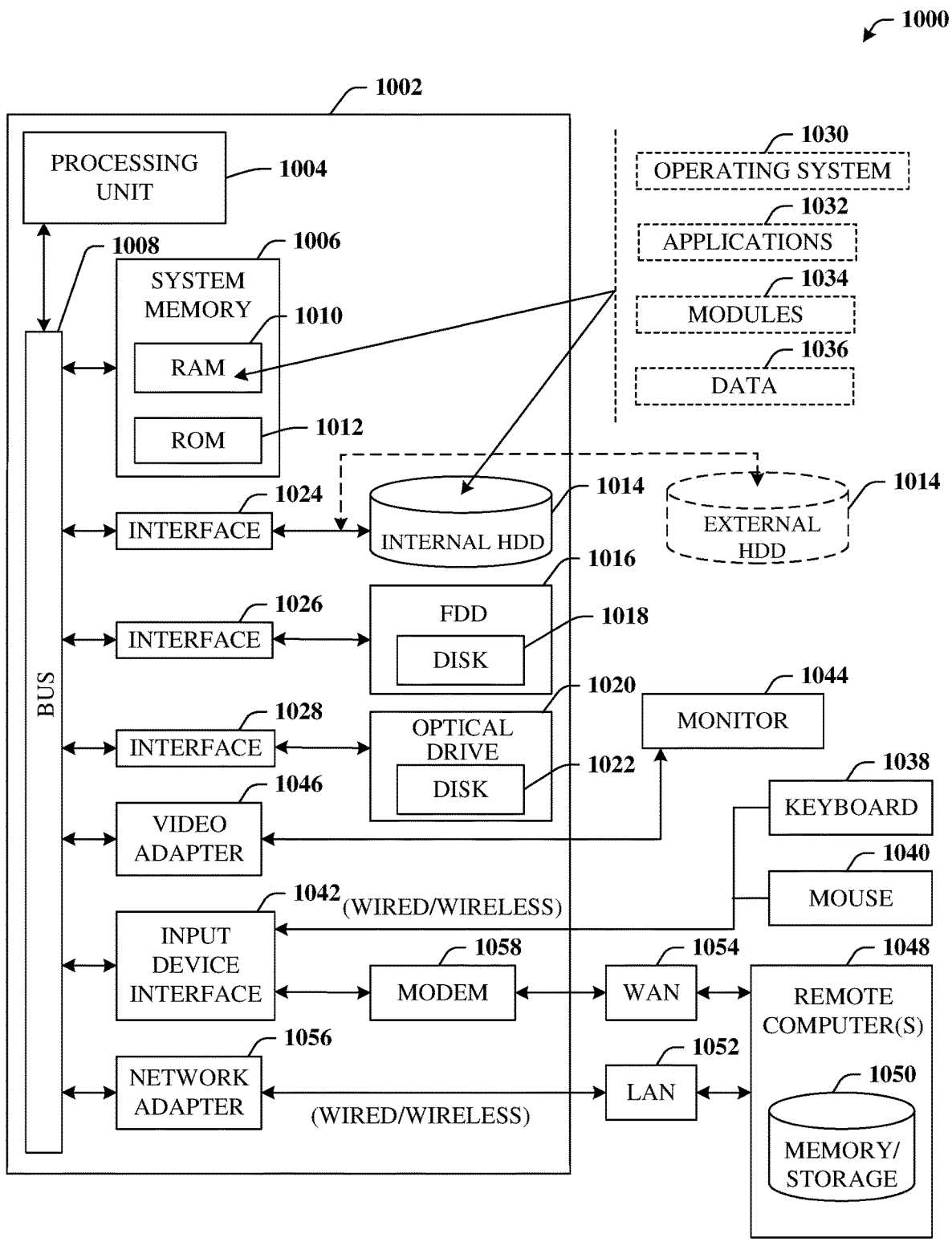
FIG. 10 illustrates an example block diagram of a computer operable to execute certain embodiments of this disclosure.

To provide further context for various aspects of the subject specification, FIGS. 9 and 10 illustrate, respectively, a block diagram of an example distributed file storage system 900 that employs tiered cloud storage and block diagram of a computer 1002 operable to execute the disclosed storage architecture in accordance with aspects described herein.

Referring now to FIG. 9, there is illustrated an example local storage system including cloud tiering components and a cloud storage location in accordance with implementations of this disclosure. Client device 902 can access local storage system 990. Local storage system 990 can be a node and cluster storage system such as an EMC Isilon Cluster that operates under OneFS operating system. Local storage system 990 can also store the local cache 992 for access by other components. It can be appreciated that the systems and methods described herein can run in tandem with other local storage systems as well.

As more fully described below with respect to redirect component 910, redirect component 910 can intercept operations directed to stub files. Cloud block management component 920, garbage collection component 930, and caching component 940 may also be in communication with local storage system 990 directly as depicted in FIG. 9 or through redirect component 910. A client administrator component 904 may use an interface to access the policy component 950 and the account management component 960 for operations as more fully described below with respect to these components. Data transformation component 970 can operate to provide encryption and compression to files tiered to cloud storage. Cloud adapter component 980 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 997 can be utilized to backup the files stored within the local storage system 990.

Cloud block management component 920 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete Mode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 920 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 960 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 920 based on list of mappings it manages. For example, each stub can be associated with an account, and the cloud block management component 920 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 980 manages the sending and receiving of data to and from the cloud service providers. The cloud adapter component 980 can utilize a set of APIs. For example, each cloud service provider may have provider specific API to interact with the provider.

A policy component 950 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 930. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 930 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 940 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 920, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 940 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 940 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue, and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be requeued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 970 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 997 can transfer a copy of the files within the local storage system 990 to another cluster (e.g., target cluster). Further, the backup/restore component 997 can manage synchronization between the local storage system 990 and the other cluster, such that, the other cluster is timely updated with new and/or modified content within the local storage system 990.

Referring now to FIG. 10, there is illustrated a block diagram of a computer 1002 operable to execute the disclosed communication architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), node(s), cluster(s), system(s), and/or device(s) disclosed herein can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 1002.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
     in response to determining that a first storage device, of a group of storage devices that are situated on a sled device comprising a user interface device, is in a state for a service to be applied to the first storage device, setting the user interface device to a first indicator state that indicates the first storage device is in the state for the service; and
     in response to determining that a service procedure, which communicatively decouples the group of storage devices from a storage array, is ready to begin:
       transmitting, to a control device of the storage array, a message that indicates the group of storage devices are to be communicatively decoupled from the storage array,
       receiving, in response to the transmitting, an indication from the control device that indicates the control device is not prepared for the group of storage device to be communicatively decoupled from the storage array, and
       setting the user interface device to a second indicator state in response to the indication that indicates the control device is not prepared for the group of storage devices to be communicatively decoupled from the storage array.

2. The device of claim 1, wherein the message comprises a first indicator that the group of storage devices will be unavailable temporarily as a result of the group of storage devices being decoupled.

3. The device of claim 2, wherein the message comprises a second indicator that the control device is not to treat a second storage device, of the group of storage devices, as having failed in response to the second storage device being unavailable temporarily as a result of the group of storage devices being decoupled.

4. The device of claim 1, wherein the determining that the service procedure is ready to begin is in response to an input received at the user interface device.

5. The device of claim 1, wherein the determining that the service procedure is ready to begin is in response to a determination that a service device is within a defined distance from the sled device.

6. The device of claim 1, wherein the operations further comprise, in response to the transmitting the message, setting the user interface device to a third indicator state that indicates the control device has been notified that the service procedure is ready to begin.

7. The device of claim 1, wherein the operations further comprise, in response to the transmitting the message, receiving, from the control device, a response that indicates the control device is prepared for the group of storage device to be communicatively decoupled from the storage array.

8. The device of claim 7, wherein the operations further comprise, in response to the receiving the response, setting the user interface device to a fourth indicator state that indicates the control device is prepared for the group of storage devices to be communicatively decoupled from the storage array.

9. The device of claim 1, wherein the group of storage devices comprises six storage devices and the six storage devices have a 2.5 inch form factor.

10. The device of claim 1, wherein the group of storage devices comprises three storage devices and the three storage devices have a 3.5 inch form factor.

11. The device of claim 1, wherein the sled device comprises a printed circuit board that controls a group of user interface elements that indicate, respectively, whether a corresponding one of the group of storage devices is in the state for the service to be applied.

12. The device of claim 11, wherein the sled device comprises a supercapacitor or a battery that provides power to the group of user interface elements when the sled device is decoupled from a power source.

13. A device, comprising:
    a processor; and
    a memory that stores executable instructions that, when executed by the processor, facilitate performance of operations, comprising:
      determining that a first storage device, of a group of storage devices that are situated on a sled device comprising a user interface device, requires service and, in response, setting the user interface device to a first state that indicates at least one of the group of storage devices situated on the sled device requires service; and
      determining that a service procedure that communicatively decouples the group of storage devices from a storage array is ready to begin and, in response:
        transmitting, to a control device that controls the storage array, a message that indicates the group of storage devices are to be communicatively decoupled from the storage array;

in response to an indication received from the control device, determining that the control device is ready for the service procedure to begin; and in response to the determining that the control device is ready, setting the user interface device to a second state.

14. The device of claim 13, wherein the operations further comprise:

receiving, in response to the transmitting the message, a first response that indicates the control device has acknowledged the message that the group of storage devices are to be communicatively decoupled from the storage array; and setting the user interface device to a third state that indicates the control device has acknowledged the message and is preparing the storage array for the group of storage devices to be communicatively decoupled.

15. The device of claim 14, wherein the determining that the control device is ready is in response to receiving, from the control device, the indication that indicates the control device is prepared for the group of storage devices to be communicatively decoupled from the storage array.

16. The device of claim 15, wherein the setting the user interface device to the second state is in response to the receiving the second response.

17. A method, comprising:

determining, by a device comprising a processor, that a service is to be applied to a first storage device, wherein the first storage device is one of a group of storage devices situated on a sled device enabling the group of storage devices to physically move;

instructing, by the device, a user interface device to present a first indication in response to a determination that the service is to be applied to a storage device of the group of storage devices, wherein the user interface device is situated on the sled device; and in response to determining that a service operation, which communicatively decouples the group of storage devices from a storage array, is ready to begin, transmitting, by the device, a message to a control device that controls operation of the storage array, wherein the message indicates the group of storage devices are to be communicatively decoupled from the storage array, and instructing, by the device, the user interface device to present a second indication in response to a determination that the control device has been notified that the service operation is ready to begin and has been instructed to prepare the storage array for communicative decoupling of the group of storage devices.

18. The method of claim 17, further comprising, in response to the instructing the user interface device to present the second indication, instructing, by the device, the user interface device to present a third indication that the service operation is not to begin while the control device prepares the storage array.

19. The method of claim 17, further comprising receiving, by the device, a reply that indicates the storage array has been prepared for the group of storage device to be communicatively decoupled.

20. The method of claim 19, further comprising, in response to the receiving the reply, instructing, by the device, the user interface device to present a fourth indication that the service operation is authorized to begin.

\* \* \* \* \*